United States Patent [19]

Schmidt et al.

[11] Patent Number: 5,495,158
[45] Date of Patent: Feb. 27, 1996

[54] APPARATUS AND METHOD USED WITH AC MOTORS FOR CONTROLLING MOTOR OPERATION

[75] Inventors: Peter B. Schmidt, Franklin; Thomas Rehm, Mequon, both of Wis.

[73] Assignee: Allen-Bradley Company, Inc., Milwaukee, Wis.

[21] Appl. No.: 316,180

[22] Filed: Sep. 30, 1994

[51] Int. Cl.$^6$ ............................ B60R 21/32; G05B 19/25
[52] U.S. Cl. ............................................ 318/561; 318/610
[58] Field of Search .................. 318/560–568.25, 318/600–610; 364/148–155, 157–166, 167.01, 172–175, 474.12, 474.15, 474.28, 474.29, 474.30

[56] References Cited

U.S. PATENT DOCUMENTS

| | | | |
|---|---|---|---|
| 4,769,583 | 9/1988 | Goor | 318/569 X |
| 4,988,935 | 1/1991 | York | 318/568.18 |
| 4,990,838 | 2/1991 | Kawato et al. | 318/568.10 |
| 5,285,379 | 2/1994 | Gamble | 364/160 |
| 5,331,264 | 7/1994 | Cheng et al. | 318/568.11 |
| 5,363,302 | 11/1994 | Allen et al. | 364/424.25 |
| 5,394,323 | 2/1995 | Yellowley et al. | 364/167.01 |

*Primary Examiner*—Brian Sircus
*Attorney, Agent, or Firm*—Michael A. Jaskolski; John J. Horn; George A. Montanye

[57] ABSTRACT

A method and apparatus for motor control tuning wherein an extremely accurate estimate of inertia is determined by using the second derivative of a desired motor velocity and the torque supplied to a motor is altered as a function of inertia.

22 Claims, 3 Drawing Sheets

APPARATUS AND METHOD USED WITH AC MOTORS FOR CONTROLLING MOTOR OPERATION

FIELD OF THE INVENTION

The present invention relates to motor controllers. More particularly, the present invention relates to a method and apparatus that uses jerk, the second derivative of velocity, to derive a motor inertia estimate which is used to tune the motor controller to compensate for the effects of changing inertia on motor operation.

BACKGROUND OF THE INVENTION

Most motors operate in dynamic environments where load torque changes during operation. For example, a milling motor on a milling machine is routinely subjected to changing load torque as the characteristics of a workpiece, including hardness, brittleness, consistency, and temperature, change during the milling process. A motor controller must compensate for the load torque in order to produce a desired motor velocity.

In determining how control torques should be altered to correct motor velocity two parameters must be considered and balanced; (1) correction quickness and (2) correction accuracy. Clearly it is desirable to eliminate the velocity error as quickly as possible. However, quick correction often results in an inaccurate velocity correction that initially overshoots or undershoots the desired speed and then oscillates about the desired speed for a period before reaching a steady state. Thus, there is a tradeoff between correction speed and correction accuracy.

Some motor applications require extremely accurate torque correction. For these applications, large velocity overshoots or undershoots during correction are unacceptable. For example, a velocity overshoot or undershoot might drive a machine tool that forms precise cuts in a workpiece into an incorrect position, might drive a robotic mechanism into a workpiece or other equipment, or might increase or decrease the tension between rolls used to collect, or disperse sheet material. Each of these examples could easily damage or destroy workpieces or machines and thus cannot be tolerated.

Control torque can be altered to effect motor velocity correction more quickly and to limit the extent to which corrected velocities overshoot or undershoot desired velocities. However, difficult to measure motor and load characteristics may reduce or exaggerate the effects of a control torque change on motor speed and accuracy and make it extremely difficult to determine how torques should be altered. In particular, if motor and load inertia, referred to herein as plant inertia, is not accounted for the effect of control torque changes may be dampened or exaggerated to an unknown extent. Unfortunately, plant inertia is often impossible to directly measure.

With a motor rotor, when the rotor is rotating in steady state at a desired velocity and the load torque changes, the motor velocity changes. Assuming the load torque is increased, the velocity would decrease. In order to return to the desired velocity the control torque to the motor would have to be increased to compensate for the change in load torque. The plant inertia which would tend to maintain the plant at the lower velocity. Often, inertia compensation is also required when motor velocity is increased deliberately by a user instead of as a reaction to a velocity error. For example, it may be desirable to step motor speed up from 100 rev/sec to 200 rev/sec. If the motor is accelerated at a constant rate up to 200 rev/sec, the plant inertia can drive the motor velocity past 200 rev/sec which might not be acceptable if precise velocity changes are required.

The industry has developed different types of adaptive control systems to compensate for both motor inertia changes and load torque disturbances. One type of commonly designed adaptive control system is model reference adaptive control (MRAC) that includes a reference model that generates an ideal motor output which is compared to an actual motor output to generate an error signal. MRACs also include adaptation mechanisms that receive the error signals and alter controller gains to compensate for the error and change motor operation accordingly.

Some MRACs have been designed to derive an inertia estimate from the control error signal and use the inertia estimate to alter controller gains in an effort to better control motor velocity. While these systems have improved the speed with which motor velocity can be altered and controlled accurately, they still have two significant deficiencies.

First, in order for the inertia estimate to be useful, the estimate must be accurate. The best inertia estimates presently used have relied on an iterative approach that mathematically combines a torque factor and an acceleration or velocity factor.

Second, present methods of employing estimated inertia are indirect and thus limit the value of the estimate. Inertia estimates are usually plugged into transfer functions or other complex equations to produce gain modifying signals that are indirectly related to the inertia estimate. While the gain modifying signals are useful, by employing the inertia estimate indirectly, these methods lose sight of the parameter of interest, inertia. Furthermore, each additional calculation used to derive a controller gain introduces additional sources of error into the gain figure.

Thus, it would be advantageous to have a motor controller that can accurately determine an estimated plant inertia and that can use the inertia estimate to directly regulate control torque delivered to a motor.

SUMMARY OF THE INVENTION

The present invention includes a method for motor control wherein an extremely accurate estimate of inertia is determined by using the second derivative of a desired motor velocity and the inertia estimate is used to tune the motor controller. The torque is increased by an amount that is proportional to the inertia estimate.

The method of the present invention is to be used with a model reference adaptive controller for regulating a control torque signal to a motor. The controller receives a command velocity signal and produces the control torque signal that drives the motor at a motor velocity. The method comprises the steps of deriving a motor velocity signal that is indicative of motor velocity, determining the difference between the motor velocity signal and the command velocity signal to produce an error signal, determining the second derivative of the command velocity signal to produce a jerk signal, mathematically combining the jerk signal and the error signal to produce a derivative signal, integrating the derivative signal to produce an inertia estimate.

In a preferred method the controller includes a feedback loop that provides a feedback torque signal and the step of using the inertia estimate includes the steps of determining the first derivative of the command velocity to produce an acceleration signal; multiplying the acceleration signal and the inertia estimate to produce a feedforward torque signal; and adding the feedforward torque signal to a feedback torque signal to produce the control torque signal.

Thus, one object of the present invention is to produce an extremely accurate estimate of inertia which can be used to control motor operation. Under the "MIT Rule", the change in a system parameter can be defined as a function of a system error and the gradient of the system error with respect to the system parameter. The motor parameter of interest here is the inertia. By including an inertia estimate as an operator in the control system, an error signal that is a function of the inertia estimate is derived. Applying the MIT Rule to the error signal, an equation that produces an accurate inertia estimate can be derived.

Importantly, when the MIT Rule is applied, the inertia estimate is a function of jerk, the second derivative of velocity. Thus, another object of the present invention is to use a jerk signal to derive an accurate inertia estimate. Comparing system errors when inertia is estimated using jerk to errors when inertia is estimated using acceleration or velocity has shown that inertia estimates derived using jerk are relatively more accurate. While applicant's do not wish to be limited to particular theory, they believe that extremely accurate inertia estimates can be derived using jerk because of how inertia and jerk are related. In effect, because inertia affects an objects resistance to any alteration in its state of motion, and jerk is the measure of how quickly the state of motion is changing, applicants believe Jerk is the best indicator of the change in inertia.

Yet another object of the present invention is to use the inertia estimate to more accurately alter the control torque to account for motor inertia. The relationship $\tau_{ff}=\hat{J}\dot{\omega}_c$, where $\tau_{ff}$ is a feedforward torque, $\hat{J}$ is the inertia estimate, and $\dot{\omega}_c$ is a command acceleration can be incorporated in a feedforward loop to add torque to the control torque that will compensate for motor inertia. In this manner, an additional torque which is directly proportional to the inertia estimate can be produce.

Also, in the preferred method, the feedback loop includes a proportional-integral control leg having a proportional constant and an integrating constant and the method further includes the steps of adjusting the proportionality constant and the integrating constant as a function of the inertia estimate for load compensation purposes.

Yet another object of the invention is to adjust controller gains so that gain changes automatically compensate for changing motor inertia. Controller gains are used to alter motor torque. Because inertia effects motor dynamics, inertia effects the extent to which a controller gain alters motor torque. By making controller gains a function of inertia, the effects of inertia can be compensated.

Preferably, the steps of adjusting include the steps of multiplying the inertia estimate by an ideal proportionality constant to produce a corrected proportionality constant and multiplying the inertia estimate by an ideal integrating constant to produce a corrected integrating constant.

Also preferably, the controller receives a torque limit signal and the method further comprises the steps of comparing the absolute value of the control torque signal to the torque limit signal and if the control torque signal is greater than or equal to the torque limit signal, maintaining the existing inertia estimate.

Thus, another object is to eliminate the possibility that the inertia estimate could increase the command torque past the saturation point of the motor. Yet another object is to eliminate the possibility of generating an erroneous inertia estimate. These objects can be simply accomplished by limiting the magnitude of the torque supplied to the motor. The torque limit should be chosen to be a saturation torque.

The preferred method also includes the steps of mathematically combining the acceleration signal and the inertia estimate to produce a transitional signal, subtracting the transitional signal from the control torque signal to produce a load torque estimate, comparing the load torque estimate to the limit torque signal; and if the load torque estimate is greater than or equal to X% of the limiting torque signal, maintaining the existing inertia estimate.

Yet another object of the invention is to ensure that the feedforward signal does not alter the inertia estimate in response to a load disturbance. The inertia is independent of any load torque disturbance and thus the inertia estimate should not change when the load torque changes. By assuming that large load torque estimates are due to load disturbances, the inertia estimate can be made essentially independent of load disturbances. Preferably X is 10%.

The present invention also includes a method to be used with a model reference adaptive controller for providing a motor torque signal which is a function of a motor inertia estimate wherein the controller receives a command velocity signal, the controller includes a controller model that produces a model velocity signal, and the motor operates at a motor velocity, the method comprising the steps of determining a motor velocity signal; determining the first derivative of the command velocity signal to produce an acceleration signal; determining the second derivative of the command velocity signal to produce a jerk signal; determining the difference between the motor velocity signal and the model velocity signal to produce an error signal; mathematically combining the jerk signal and the error signal to produce a derivative signal; integrating the derivative signal to produce an inertia estimate; mathematically merging the acceleration signal and the inertia estimate to produce a feedforward signal; and adding the feedforward signal to a feedback signal to produce the motor torque signal.

The present invention also includes an apparatus to be used with the method above, a sensor to determine a motor velocity signal; a difference calculator that produces an error signal by determining the deviation between a motor velocity signal and a model velocity signal; a derivation module that receives the command velocity signal and determines the second derivative of the command velocity signal thus producing a jerk signal; a multiplier to multiply the jerk signal, the error signal, and a gain signal to produce a derivative signal; an integrator that receives and integrates the derivative signal thus producing an inertia estimate; and a compensator that uses the inertia estimate to derive the motor torque signal and "tune" the motor controller.

Preferably, the derivation module also determines the first derivative of the command velocity, thus producing an acceleration signal and the compensator comprises a second multiplier that multiplies the acceleration signal and the inertia estimate thus producing a feedforward signal; and a summing module that adds the feedforward signal to a feedback signal to produce the motor torque signal.

Also, preferably, a feedback loop is included in the controller which includes a proportional-integral control leg having a proportionality constant and an integrating constant, the apparatus further including an adaptation module that adjusts the proportionality constant and the integrating constant as a function of the inertia estimate. The controller may receive a torque limiting signal and the apparatus further comprises a comparator module that compares the motor torque signal to the torque limiting signal; and a first blocking module that, if the absolute value of the motor torque signal is greater than or equal to the torque limiting signal, maintains the existing inertia estimate.

The apparatus may also have a second derivation module that determines the second derivative of the model velocity signal to produce a model jerk signal; a third multiplier that multiplies the model acceleration signal and the inertia estimate to produce a transitional signal; a subtractor that subtracts the transitional signal from the motor torque signal to produce a load torque estimate; a second comparator to compare the load torque estimate to the limiting torque signal; and a second blocking module that, if the load torque estimate is greater than or equal to 10% of the limiting torque signal, maintains the existing inertia estimate.

Other and further aspects of the present invention will become apparent during the course of the following description and by reference to the accompanying drawings.

DETAILED DESCRIPTION OF THE PREFERRED EMBODIMENT

Figure 1:
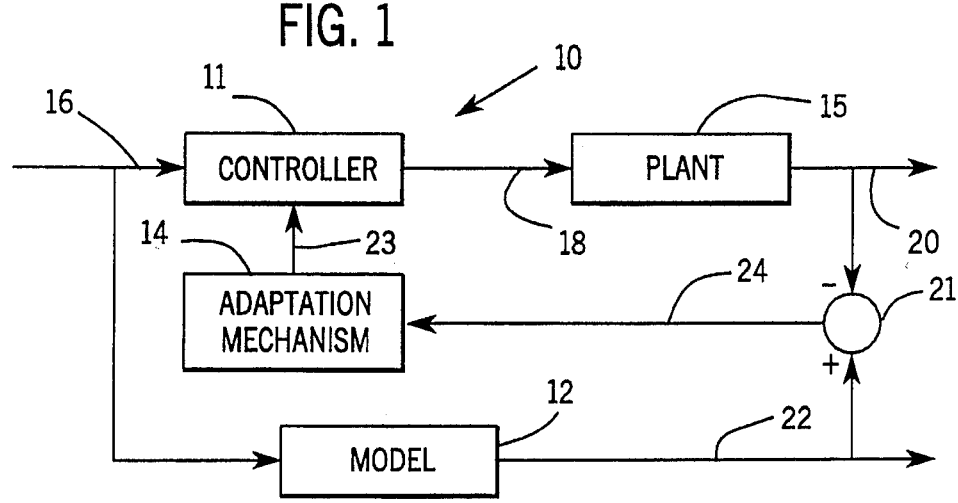
FIG. 1 is a block diagram showing a model reference adaptive control system.

The present invention will be described in the context of the exemplary MRAC system 10 shown in FIG. 1. The major components of a MRAC are an adjustable controller 11, a reference model 12, and an adaptation mechanism 14.

The controller 11 receives a control signal 16 indicating a desired motor condition, and produces a command signal 18 for driving the plant 15. Instead of operating at the desired condition, the plant operates at a plant condition represented by plant signal 20. As described in more detail below, the reference model 12 also receives the command signal 16 and produces an ideal motor condition signal 22. Summation node 21 subtracts the plant signal 20 from the ideal motor condition signal 22 and produces an error signal 24. The error signal 24 is used by the adaptation mechanism 14 to produce alter signals 23 for altering the controller gains/parameters which alter the command signals.

Importantly, under the "MIT Rule" which is well known in the art, a change in a system parameter can be defined as a function of the system error and the gradient of the system error with respect to the system parameter. The gradient of the error is the partial derivative of the error with respect to the parameter. In the present invention, the parameter of interest is the inertia estimate $\hat{J}$. Applying the MIT Rule, the change in inertia estimate $\hat{J}$ with respect to time is a function of the system error and the partial derivative of the error with respect to the inertia estimate $\hat{J}$. Thus:

$$\dot{\hat{J}} = \frac{d\hat{J}}{dt} = -\gamma\epsilon\frac{\partial\epsilon}{\partial\hat{J}} \qquad (1)$$

where $\gamma$ is a gain and $\epsilon$ is the system error 24. And therefore:

$$\hat{J} = \frac{1}{s} \cdot -\gamma\epsilon\frac{\partial\epsilon}{\partial\hat{J}} \qquad (2)$$

where 1/s is the classical Laplace integration operator.

Given the relationship in Eq. 2, the inertia estimate $\hat{J}$ must be incorporated as a variable gain somewhere in the MRAC in order to derive the inertia estimate $\hat{J}$. This is necessary because the partial derivative of the error $\epsilon$ with respect to the inertia estimate $\hat{\ }$ can only be calculated if the error $\epsilon$ is a function of the inertia estimate $\hat{J}$.

Figure 2:
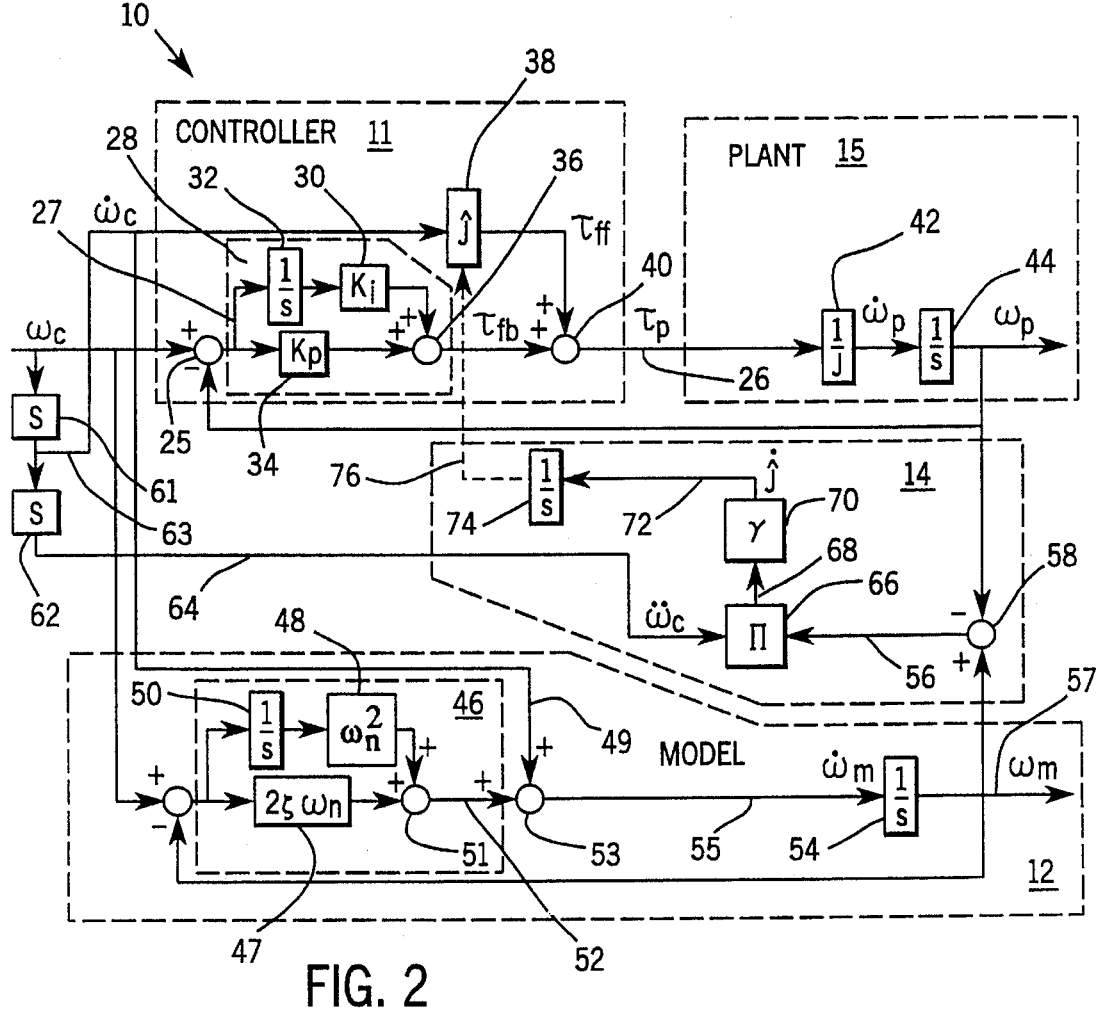
FIG. 2 is a detailed block diagram of the model reference adaptive control system of the present invention.

Referring to FIG. 2, the present invention uses the inertia estimate $\hat{J}$ to fine tune motor torque so that motor velocity follows command velocity signals. The command velocity $\omega hd c$ is supplied to an MRAC 10 incorporating the present invention. Initially, two derivative blocks 61, 62 produce an acceleration signal $\dot{\omega}_c$ and a jerk signal $\ddot{\omega}_c$. All velocity, acceleration, and jerk signals throughout the disclosure, although not always referred to as such, are angular in nature. The command velocity signal $\omega_c$ is provided to both the controller 11 and the model 12. In the controller 11, the motor velocity signal $\omega_p$ is subtracted from the command velocity signal $\omega_c$ at summation node 25 to produce a feedback error signal 27. The feedback error signal 27 is provided to a standard proportional-integral (PI) controller 28 including a proportionality constant 34 in parallel with the series combination of an integrating constant 30 and an integrator 32. The outputs of the integrating constant 30 and proportionality constant 34 are added at summation node 36 to produce a feedback torque $\tau_{fb}$.

A feedforward control loop is provided to help insure that the plant velocity $\omega_p$ follows the command velocity $\omega_c$. In the plant representation 15, the plant is modeled as a simple inertia system and therefore, the feedforward torque $\tau_{ff}$ and resulting command torque signal $\omega_p$ are a function of inertia. The inertia dependent feedforward torque $\tau_{ff}$ satisfies the need for inertia estimate variable gain somewhere in the MRAC. The command acceleration $\dot{\omega}_c$ is provided on line 63 to inertia multiplier 38 which multiplies the command acceleration $\dot{\omega}_c$ by the inertia estimate $\hat{J}$ to produce a feedforward torque $\tau_{ff}$. The feedback and feedforward torques $\tau_{fb}$ and $\tau_{ff}$ are added together at summation node 40 to produce the command torque signal $\tau_p$ on line 26. $\tau_p$ is then provided to plant 15.

For the purposes of the present invention, the plant 15 is simply represented as a purely inertial system. The present invention only compensates for motor inertia and load inertia that is directly coupled to the motor shaft. It ignores the effects of other motor parameters such as backlash and friction. In a working embodiment, both friction and backlash might be compensated for including additional feedforward control loops. Here, however, such additional feedforward loops have been eliminated in order to simplify the explanation of the invention.

In a motor that is reduced to a simple inertial system, angular acceleration is equal to the torque applied to the motor divided by the motor inertia J. By integrating the angular acceleration the angular velocity of a motor can be derived. Therefore, a plant 15 that receives torque and rotates at a motor velocity $\omega_p$ can be represented by a control torque $\tau_p$ entering an inertia divider 42 to produce angular acceleration $\dot{\omega}_p$ and an integrator 44 that receives the angular acceleration $\dot{\omega}_p$ and produces the angular velocity signal $\omega_p$.

The controller 11 and plant 15 portions of the MRAC system can be used to derive a mathematical expression for the angular velocity $\omega_p$ based on the command velocity signal $\omega_c$. Thus, applying basic mathematical techniques to FIG. 2 a relationship between the command velocity signal $\omega_c$ and the motor velocity signal $\omega_p$ can be derived:

$$\omega_p = \left[ (\omega_c - \omega_p)\left(k_p + \frac{k_i}{S}\right) + \omega_c s \hat{J} \right] \left(\frac{1}{Js}\right) \quad (3)$$

Combining terms and rearranging terms to solve for $\omega_p$ as a function of $\omega_c$:

$$\omega_p = \frac{\hat{J}s^2 + K_p s + K_i}{Js^2 + K_p s + K_i} \omega_c. \quad (4)$$

Thus, it can be seen that given the control system shown in FIG. 2, if the inertia estimate $\hat{J}$ equals the actual inertia $J$ the motor velocity $\omega_p$ will track the command velocity $\omega_c$ as desired. Clearly, Eq. 4 indicates that the MRAC employed in the present invention will operate best if a highly accurate inertia estimate $\hat{J}$ can be derived.

Referring still to FIG. 2, the reference model 12 defines a second order transfer function that is similar to the transfer function of the combined controller 11 and plant 15 except that the model represents a controller motor system wherein inertia has little effect. As well known in the art, there are two parameters that define the characteristics of a reference model: the damping co-efficient $\xi$, and the bandwidth $\omega_n$. These two parameters are included in a PI controller 46 portion of the reference model 12 and together define a proportionality constant 47 and an integrating constant 48.

Like the controller 11, the reference model 12 also includes an integrator 50 in series with the integrating constant 48 to form an integrating leg that is in parallel with the proportionality constant 47. The outputs of the integration and proportionality constants 48, 47 are added together at summation node 51 to produce signal 52. The model 12 also includes a feedforward control loop consisting of a command acceleration input 49. Signal 52 and acceleration input 49 are added at summation node 53 which produces a model acceleration signal $\dot{\omega}_m$ on line 55. The model acceleration signal $\dot{\omega}_m$ on line 55 is operated on by an integrator 54 to produce the model velocity signal $\omega_m$ on line 57. Applying basic mathematical techniques to the model 12, a relationship between the command velocity signal $\omega_c$ and the model velocity signal $\omega_m$ can be derived:

$$\omega_m = \left[ (\omega_c - \omega_m)\left(\frac{\omega_n^2}{s} + 2\zeta\omega_n\right) + \omega_c s \right]\left(\frac{1}{s}\right). \quad (5)$$

Combining terms and rearranging terms to solve for $\omega_m$ as a function of $\omega_c$:

$$\omega_m = \frac{s^2 + 2\zeta\omega_n s + \omega_n^2}{s^2 + 2\zeta\omega_n s + \omega_n^2} \omega_c. \quad (6)$$

Thus, given the model shown in FIG. 2, the model velocity signal $\omega_m$ should be identical to the control velocity $\omega_c$ during motor operation.

The motor velocity signal up is subtracted from the model velocity signal $\omega_m$ at summation node 58 to produce error signal 56. Importantly, the model 12 simulates the controller and the plant wherein both the controller and plant are unaffected by inertia. In other words, $\omega_m$ follows $\omega_c$ precisely and the difference between $\omega_m$, a value derived without inertia, and $\omega_p$, a value that is inertia dependent, is due primarily to uncompensated motor inertia or error in the inertia estimate.

Given that the error signal 56, or $\epsilon$, equals $\omega_m - \omega_p$, and that $\omega_p$ is a function of the inertia estimate $\hat{J}$ the error $\epsilon$ is also a function of $\hat{J}$. Combining Eqs. 4 and 6, the partial derivative of the error $\epsilon$ with respect to the inertia estimate $\hat{J}$ can be expressed as:

$$\frac{\partial \epsilon}{\partial \hat{J}} = \frac{-s^2}{Js^2 + K_p s + K_i} \omega_c \quad (7)$$

Because $\omega_c S^2$ is the second derivative of $\omega_c$, Equation 7 can be rewritten as:

$$\frac{\partial \epsilon}{\partial \hat{J}} = \frac{-\ddot{\omega}_c}{Js^2 + K_p s + K_i} \quad (8)$$

Combining Eqs. 1 and 8, the change in inertia estimate with respect to time can be expressed as:

$$\frac{d\hat{J}}{dt} = \gamma\epsilon \frac{\ddot{\omega}_c}{\text{(2nd order filter)}} \quad (9)$$

Thus, the inertia estimate $\hat{J}$ can be expressed as:

$$\hat{J} = \left(\frac{\gamma\epsilon}{s}\right)\left(\frac{\ddot{\omega}_c}{\text{2nd order filter}}\right) \quad (10)$$

Equation 10 is implemented in FIG. 2. The adaptation mechanism 14 receives the angular jerk signal $\ddot{\omega}_c$ on line 64 and the system error signal 56, and multiplies the two signals at product block 66 to produce a conversion signal on line 68. Note that the second order filter is not provided in FIG. 2 in order to simplify the figure and this explanation. The conversion signal on line 68 is provided to a gain block 70 which produces the change in inertia estimate $\hat{J}$ on line 72. The change in inertia estimate $\hat{J}$ is then integrated at integration block 74 and produces the inertia estimate $\hat{J}$ on line 76 which is provided to the inertia multiplier 38.

Thus, the second derivative $\ddot{\omega}_c$ of the command velocity signal $\omega_c$ is used to derive a highly accurate inertia estimate $\hat{J}$. Once inertia is estimated, it can be used to adjust the control torque $\tau_p$ and eliminate the effects of inertia on the system.

Figure 3:
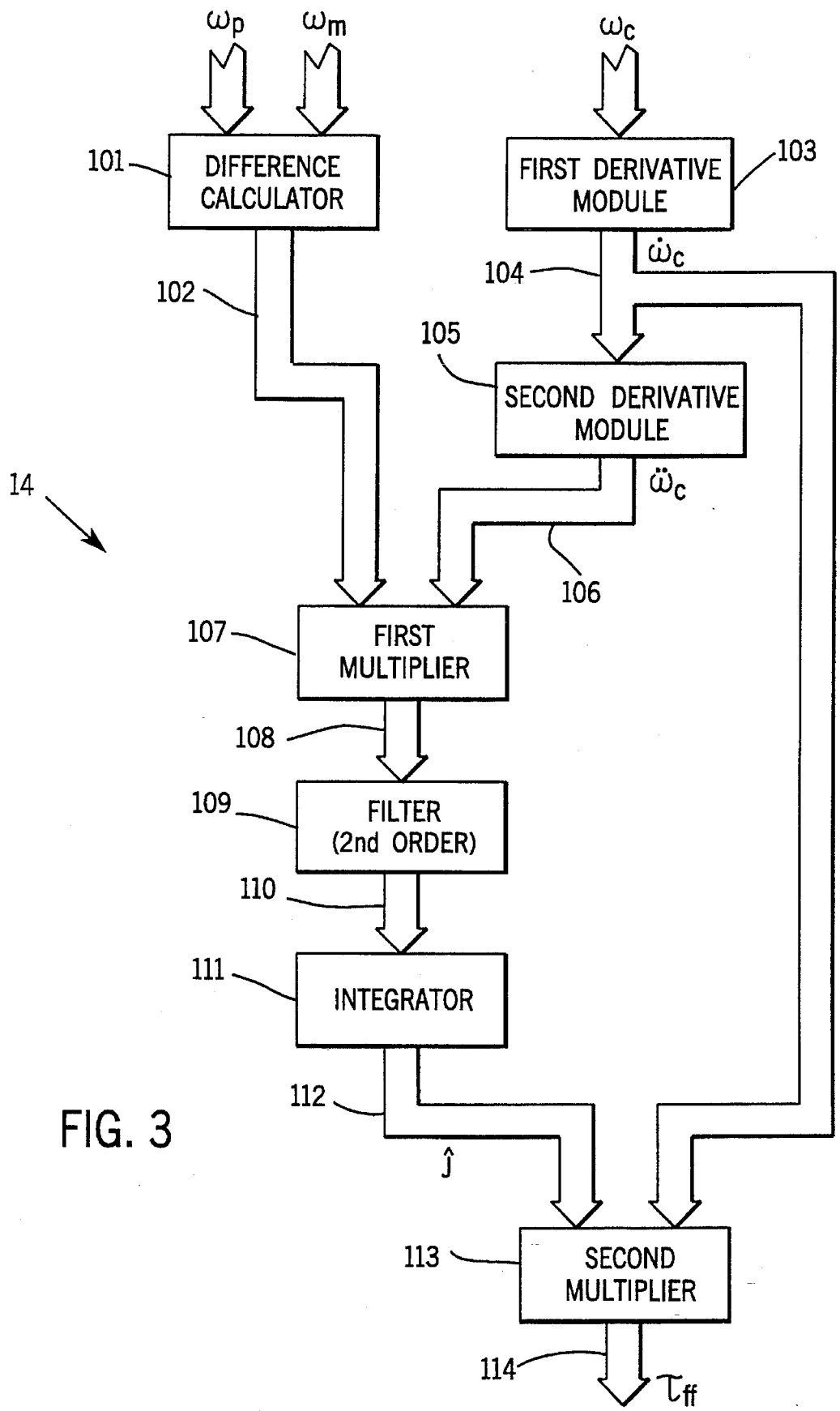
FIG. 3 is a block diagram depicting operation of the adaptation mechanism of the present invention.

Referring to FIG. 3, the adaptation mechanism 14 can be understood as consisting of a number of different modules and calculators that determine an inertia estimate and use the inertia estimate to alter the gains (i.e. $\hat{J}$, $k_p$ and $k_i$) which in turn change the command torque $\tau_p$. In FIG. 3, a difference calculator 101 receives both the motor velocity $\omega_p$ and the model velocity $\omega_m$ and subtracts the motor velocity signal $\omega_p$ from the model velocity signal $\omega_m$ to produce an error signal 102. The command velocity signal $\omega_c$ is provided to a first derivative module 103. The first derivative module take the derivative of the command velocity signal $\omega_c$ and produces a command acceleration signal 104. The command acceleration signal 104 is provided to a second derivative module 105 and the second derivative module produces a command jerk signal 106. The command jerk signal 106 and the error signal 102 are both received by a first multiplier 107 that multiplies the two signals 102, 106 and produces a change in inertia estimate signal 108. The change in inertia estimate signal 108 is provided to a second order signal filter 109 that produces a filtered signal 110. The filtered signal 110 is the change in inertia estimate $\hat{J}$ with respect to time. Thus, by integrating the filtered signal 110, integrator 111 produces an inertia estimate 112. The inertia estimate 112 and command acceleration signal 104 are both provided to a second multiplier 113 that multiplies the two signals together and produces a feedforward torque signal 114 denoted by the symbol $\tau_{ff}$.

In operation, once the inertia estimate $\hat{J}$ is generated, when the controller receives a command velocity signal $\omega_c$ indicating a change in motor velocity $\omega_p$, the command acceleration signal changes to either a positive signal (indicating an increase in velocity) or a negative signal (indicating a decrease in velocity). When the acceleration signal $\dot{\omega}_c$ is positive and a velocity increase is desired, the product of $\omega_c$ and the inertia estimate $\hat{J}$ at inertia multiplier 38 produces a positive torque $\tau_{ff}$ which overcomes the inertia of the motor that would tend to maintain the motor at the lower velocity. When the acceleration signal $\omega_c$ is negative and a velocity decrease is desired, the product of $\omega_c$ and the inertia multiplier 38 produces a negative torque $\tau_{ff}$ which overcomes the inertia of the motor that would tend to maintain the motor at the higher velocity.

Importantly, not only does the present invention determine an extremely accurate inertia estimate, but the present invention also uses the estimate directly in order to change the command torque $\tau_p$. By forming the feedforward torque $\tau_{ff}$ as the product of the command acceleration $\omega_c$ and the inertia estimate $\hat{J}$ the present invention uses the inertia estimate in a simple and direct manner to alter the command torque $\tau_p$. Thus, no error is introduced into the feedforward loop between the inertia estimate derivation and employment of the estimate.

Figure 4:
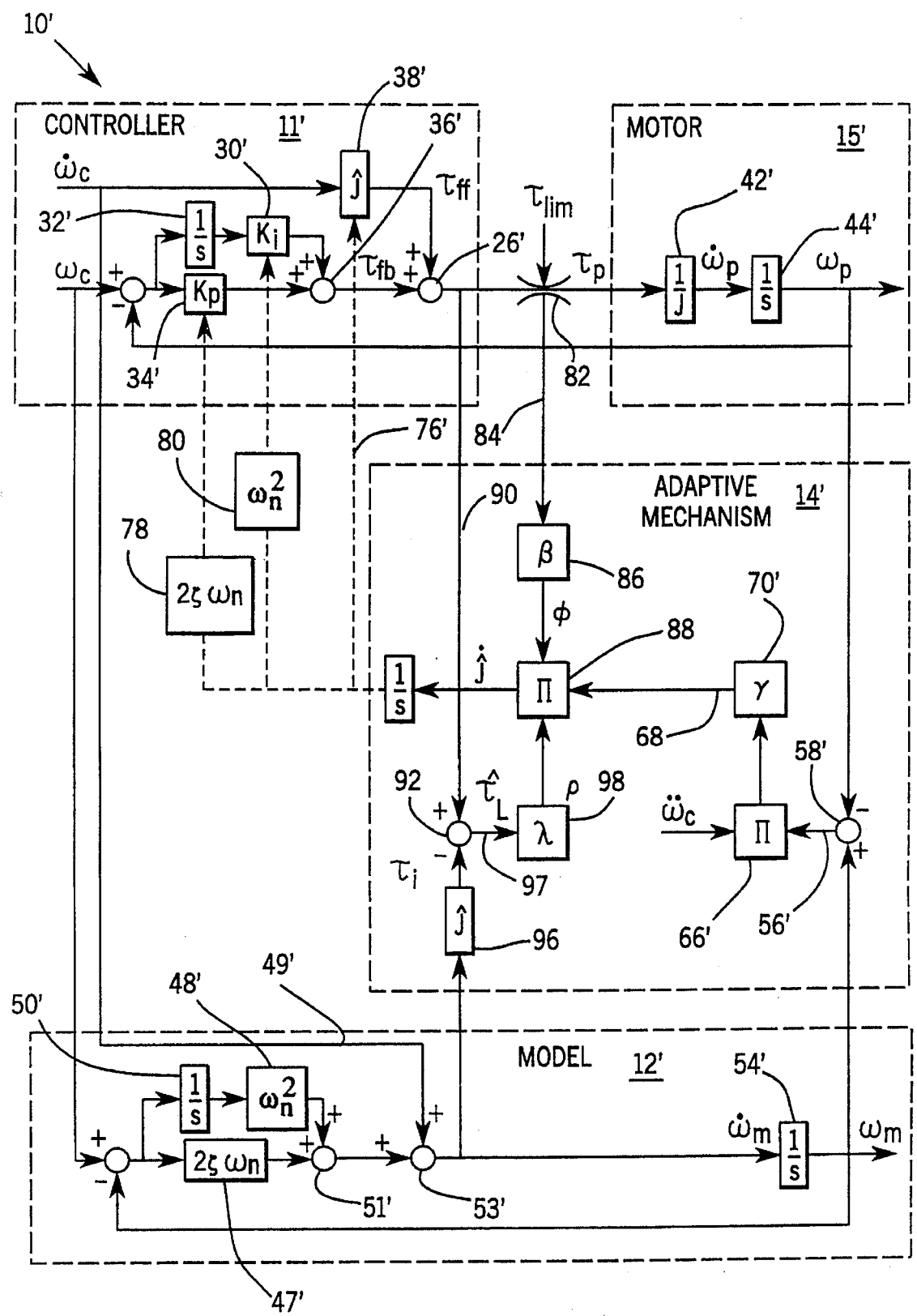
FIG. 4 is a detailed block diagram of a preferred model reference adaptive control system of the present invention.

Referring now to FIG. 4, an embodiment of the present invention including a torque limiting mechanism is shown. As the embodiment in FIG. 4 is similar to the embodiment in FIG. 2, components in FIG. 2 have been identified by the same numbers followed by an apostrophe in FIG. 4. In addition, as similarly marked components operate in identical manners, similarly marked components in FIG. 4 are not explained again in reference to FIG. 4.

In addition to compensating for the motor inertia during deliberate velocity changes, the inertia estimate $\hat{J}$ can be used to recalculate the proportionality constant $K_p$ and the integrating constant $K_i$ in the feedback loop of the controller 11 so that those constants can be altered in a manner that compensates for a change in inertia. Referring to Eqs. 6 and 4, in Eq. 4, assuming that the inertia estimate $\hat{J}$ is identical to the actual motor inertia J, if both the numerator and denominator are divided by the inertia J, and the resulting denominator is equated to the denominator from Eq. 6, then new proportionality constant $K_p$ and new integrating constant $K_i$ can be expressed as:

$$K_p = 2\zeta\omega_n \hat{J} \quad (11)$$

and, $$K_i = \omega_n^2 \hat{J}. \quad (12)$$

The new proportionality and integrating constants $K_p$ and $K_i$ compensate for the inertia estimate and thus are more accurate than the original constants. Referring to FIG. 4, $K_p$ and $K_i$ can easily be altered by providing the inertia estimate $\hat{J}$ to appropriate multiplier boxes 78, 80 respectively that provide new $K_p$ and $K_i$ values to the controller 11 in order to tune the motor controller system with respect to changing inertia.

In a preferred embodiment, in order to eliminate the possibility of the feedforward torque $\tau_{ff}$ and the feedback torque $\tau_{fb}$ providing too much torque to the plant 15, a torque limit $\tau_{lim}$ can be used to limit the magnitude of the control torque $\tau_p$. In reality, the torque limit $\tau_{lim}$ reflects the actual limitation of a torque regular which is only capable of producing a finite amount of torque. Referring still to FIG. 4, a torque limiter 82 provides the control torque signal $\tau_p$ and a torque limit signal $\tau_{lim}$ along line 84 to a multiplier box 86 where a nonlinear function $\beta$ based on the torque limit $\tau_{lim}$, creates a torque limiting signal $\Phi$ according to Eq. 13:

$$\Phi = \begin{cases} 1 \text{ if } T_p < T_{lim} \\ 0 \text{ if } T_p \geq T_{lim} \end{cases} \quad (13)$$

Next, the torque limiting signal $\Phi$ is provided to product box 88 which also receives the conversion signal on line 68'. Thus, when the control torque $\tau_p$ is less than the torque limit $\tau_{lim}$, the conversion signal on line 68' is passed on and the inertia estimate $\hat{J}$ is multiplied by the command acceleration to provide the feedforward torque $\tau_{ff}$. However, when the control torque $\tau_p$ is greater than or equal to the limit torque $\tau_{lim}$, the torque limiting signal $\Phi$ is zero and, when multiplied by the conversion signal at product box 88, the inertia estimate maintains its present state or value. Once the control torque $\tau_p$ dips below the torque limit $\tau_{lim}$, $\Phi$ becomes 1 and $\hat{J}$ is again free to change.

Inertia is only a function of an objects mass and its geometry. Thus, while $\omega_p$ changes due to load torque disturbances, some mechanism that distinguishes between inertia change estimates due to load torque versus estimates due to actual inertia changes should be employed. To eliminate the possibility of altering the inertia estimate based on load disturbances, an inertia torque $\tau_i$ is determined and subtracted from the command torque $\tau_p$ to derive an estimated load torque $\hat{\tau}_L$. The inertia torque $\tau_i$ can be determined by multiplying the model angular acceleration $\omega_m$ by the inertia estimate $\hat{J}$ at inertia multiplier 96. The inertia torque $\tau_i$ is subtracted from the control torque $\tau_p$ at summing node 92 and a load torque estimate $\hat{\tau}_L$ is produced at 97. The load torque estimate $\hat{\tau}_L$ is provided along line 97 to multiplier box 98 where a second nonlinear function $\lambda$, which is dependent on the torque estimate $\hat{\tau}_L$, creates a load disturbance signal $\rho$ according to Eq. 14:

$$\rho = \begin{cases} 1 \text{ if } |\hat{\tau}_L| < 10\% \ \tau_{lim} \\ 0 \text{ if } |\hat{\tau}_L| \geq 10\% \ \tau_{lim} \end{cases} \quad (14)$$

The load disturbances signal $\rho$ is provided to multiplier box 88 and allows the inertia estimate $\hat{J}$ to be altered only if $\rho=1$. In effect if the load torque $\hat{\tau}_L$ is equal to or greater than 10% of the limit torque $\tau_{lim}$, the adaptation mechanism 14' assumes that any error in motor velocity $\omega_p$ is due to a load disturbance rather than an inertia estimate error and maintains the present inertia estimate. The 10% $\tau_{lim}$ value was chosen on the perceived notion that errors in the inertia estimate would fall within this range. Some other similar number might be chosen in a different system.

While the specification above explains the present invention in relation to an apparatus, it should be understood that the present invention also includes a method of determining inertia from jerk and using the inertia estimate to optimally tune the motor operation. It should also be understood that the method of the present invention could easily be implemented in software. The method of the present invention includes receiving a command velocity signal $\omega_c$, determining a model velocity $\omega_m$, determining an actual motor velocity signal $\omega_p$, comparing the actual motor velocity signal $\omega_p$ and the model velocity signal $\omega_m$ to determine an error signal $\epsilon$, deriving the first and second derivatives $\dot{\omega}_c$, $\ddot{\omega}_c$ of the command velocity signal $\omega_c$ to produce an acceleration command signal and a jerk command signal, multiplying the jerk command signal $\ddot{\omega}_c$ by the error signal $\epsilon$ to produce a derivative signal, subjecting the derivative signal to a gain to produce an intermediate signal, integrating the intermediate signal to produce an inertia estimate, multiplying the acceleration command signal $\dot{\omega}_c$ by the inertia estimate $\hat{J}$ to produce a feedforward torque signal $\tau_{ff}$, and adding the feedforward torque signal $\tau_{ff}$ to the feedback torque signal $\tau_{fb}$ to produce a command torque $\tau_p$ to the motor.

It should be understood that the methods and apparatuses described above are only exemplary and do not limit the scope of the invention, and that various modifications could be made by those skilled in the art that would fall under the scope of the invention. For example, as the model velocity signal $\omega_m$ is identical to the command velocity signal $\omega_c$, the model in the present invention may not be needed because any need for the model velocity signal, the model acceleration signal, or a model jerk signal could be met by using the command velocity signal, the command acceleration signal, or the command jerk signal. In addition, where an industrial controller does not utilize the feedforward signal, the MRAC could be designed by placing the inertia estimate directly in the model of the plant, determining the system error by subtracting the motor velocity signal $\omega_p$ from the model velocity $\omega_m$ and adjusting the proportionality constant $K_p$ and integrating constant $K_i$ accordingly.

Furthermore, additional feedforward loops might be added to the preferred embodiments of the invention in order to eliminate the affects of friction and backlash that also affect motor operation.

We claim:

1. A method to be used with a model reference adaptive motor controller where the motor controller receives a command velocity signal and produces the control torque signal that drives a motor at a motor velocity, said method estimates inertia and tunes the controller, the method comprising the steps of:

(a) deriving a motor velocity signal that is indicative of motor velocity;

(b) determining the difference between the motor velocity signal and the command velocity signal to produce an error signal;

(c) determining the second derivative of the command velocity signal to produce a jerk signal;

(d) mathematically combining the jerk signal and the error signal to produce a derivative signal;

(e) integrating the derivative signal to produce an inertia estimate; and (f) using the inertia estimate to alter the control torque signal.

2. The method as recited in claim 1 wherein the controller includes a feedback loop that provides a feedback torque signal and the step of using the inertia estimate includes the steps of:

(a) determining the first derivative of the command velocity signal to produce an acceleration signal;

(b) mathematically merging the acceleration signal and the inertia estimate to produce a feedforward torque signal; and (c) adding the feedforward torque signal to a feedback torque signal to produce the motor torque signal.

3. The method as recited in claim 2 wherein the controller receives a torque limit signal and the method further comprises the steps of:

comparing the control torque signal to the torque limit signal; and if an absolute value of the control torque signal is greater than or equal to the torque limit signal, maintaining the existing inertia estimate.

4. The method as recited in claim 3 further including the steps of:

determining an inertia torque signal;

subtracting the inertia torque signal from the control torque signal to produce a load torque estimate;

comparing the load torque estimate to the limit torque signal; and if an absolute load torque estimate is greater than or equal to X % of the limit torque signal, maintaining the existing inertia estimate, where X is a predetermined value.

5. The method as recited in claim 4 wherein X is 10.

6. The method as recited in claim 2 wherein the step of mathematically merging includes the step of multiplying the acceleration signal and the inertia estimate.

7. The method as recited in claim 1 wherein the controller includes a feedback loop having a proportional-integral control leg having a proportionality constant and an integrating constant, the method further including the steps of adjusting the proportionality constant and the integrating constant as a function of the inertia estimate.

8. The method as recited in claim 7 wherein the steps of adjusting include the steps of multiplying the inertia estimate by an ideal proportionality constant to produce a corrected proportionality constant and multiplying the inertia estimate by an ideal integrating constant to produce a corrected integrating constant.

9. The method as recited in claim 8 wherein the ideal proportionality constant $k_p$ is $2\zeta\omega_n$ and the ideal integrating constant is $\omega^2_n$, where $\zeta$ is a damping coefficient and $\omega_n$ is an ideal bandwidth.

10. The method as recited in claim 1 wherein the step of mathematically combining includes the steps of multiplying the jerk signal and the error signal to produce an intermediate signal and multiplying the intermediate signal by a gain signal to produce the derivative signal.

11. A method to be used with a model reference adaptive motor controller for regulating a control torque signal to a motor, the motor controller receives a command velocity signal and produces the control torque signal that drives the motor at a motor velocity, the controller includes a model that produces a model velocity signal indicative of an ideal motor velocity, the controller also includes a feedback loop, the method comprising the steps of:

(a) determining a motor velocity signal indicative of the motor velocity;

(b) determining the first derivative of the command velocity signal to produce an acceleration signal;

(c) determining the second derivative of the command velocity signal to produce a jerk signal;

(d) determining the difference between the motor velocity signal and the model velocity signal to produce an error signal;

(e) mathematically combining the jerk signal and the error signal to produce a derivative signal;

(f) integrating the derivative signal to produce an inertia estimate;

(g) mathematically merging the acceleration signal and the inertia estimate to produce a feedforward torque signal; and (h) adding the feedforward signal to a feedback signal to produce the control torque signal.

12. The method as recited in claim 11 wherein the feedback loop includes a proportional-integral control leg having a proportionality constant and an integrating constant, the method further including the steps of adjusting the proportionality constant and the integrating constant as a function of the inertia estimate.

13. The method as recited in claim 12 wherein the steps of adjusting include the steps of multiplying the inertia estimate by an ideal proportionality constant to produce a corrected proportionality constant and multiplying the inertia estimate by an ideal integrating constant to produce a corrected integrating constant.

14. The method as recited in claim 12 wherein the controller receives a torque limit signal and, the method further comprises the steps of:

comparing the control torque signal to the torque limit signal; and if the absolute value of the control torque signal is greater than or equal to the torque limit signal, setting the change in inertia estimate equal to zero.

15. The method as recited in claim 14 further including the steps of:

determining the first derivative of the model velocity signal to produce a model acceleration signal;

mathematically combining the model acceleration signal and the inertia estimate to produce a transitional signal;

subtracting the transitional signal from the control torque signal to produce a load torque estimate;

comparing the load torque estimate to the limit torque signal; and if the load torque estimate is greater than or equal to 10% of the limit torque signal, setting the change inertia estimate equal to zero.

16. A method to be used with a model reference adaptive motor controller for regulating a control torque signal to a motor, the motor controller receives a command velocity signal and produces the control torque signal that drives the motor at a motor velocity, the controller includes a feedback loop, the method comprising the steps of:

(a) deriving a motor signal that is indicative of motor velocity;

(b) determining the difference between the motor signal and the command velocity signal to produce an error signal;

(c) determining the first derivative of the command velocity signal to produce an acceleration signal;

(d) determining the second derivative of the command velocity signal to produce a jerk signal;

(e) mathematically combining the jerk signal and the error signal to produce a derivative signal;

(f) integrating the derivative signal to produce an inertia estimate;

(g) mathematically merging the acceleration signal and the inertia estimate to produce a feedforward torque signal; and (h) adding the feedforward signal to a feedback signal to produce the control torque signal.

17. An apparatus to be used with a model reference adaptive motor controller for regulating a control torque signal to a motor, the motor controller receives a command velocity signal and produces the control torque signal that drives the motor at a motor velocity, the controller includes a model that produces a model velocity signal indicative of an ideal motor velocity, the apparatus comprising:

(a) a sensor to determine an actual motor velocity signal;

(b) a difference calculator that produces an error signal by determining the deviation between a motor velocity signal and a model velocity signal;

(c) a derivation module that receives the command velocity signal and determines the second derivative of the command velocity signal thus producing a jerk signal;

(d) a multiplier to multiply the jerk signal, the error signal, and a gain to produce a derivative signal;

(e) an integrator that receives and integrates the derivative signal thus producing an inertia estimate; and (f) a compensator that uses the inertia estimate to derive the motor torque signal.

18. The apparatus as recited in claim 17 wherein the controller includes a feedback loop and the derivation module also determines the first derivative of the command velocity, thus producing an acceleration signal, and the compensator comprises:

(a) a second multiplier that multiplies the acceleration signal and the inertia estimate thus producing a feedforward signal; and (b) a summing module that adds the feedforward signal to a feedback signal to produce the control torque signal.

19. The apparatus as recited in claim 18 wherein the feedback loop includes a proportional-integral control leg having a proportionality constant and an integrating constant, the apparatus further including an adaptation module that adjusts the proportionality constant and the integrating constant as a function of the inertia estimate.

20. The apparatus as recited in claim 19 wherein the controller receives a torque limit signal and the apparatus further comprises:

a comparator module that compares the control torque signal to the torque limit signal; and a first blocking module that, if the absolute value control torque signal is greater than the torque limit signal, sets the change in inertia estimate equal to zero.

21. The apparatus as recited in claim 20 further comprising:

a second derivation module that determines the second derivative of the model velocity signal to produce a model jerk signal;

a third multiplier that multiplies the model acceleration signal and the inertia estimate to produce a transitional signal;

a subtractor that subtracts the transitional signal from the control torque signal to produce a load torque estimate;

a second comparator to compare the load torque estimate to the limit torque signal; and a second blocking module that, if the load torque estimate is greater than or equal to X % of the limit torque signal, sets the inertia estimate equal to zero where X is a predetermined value.

22. The apparatus as recited in claim 20 wherein X is 10.

* * * * *